(No Model.)

R. McDONAH.
NUT LOCK.

No. 421,358. Patented Feb. 11, 1890.

WITNESSES:
Norris A. Clark
Nettie Hilts

INVENTOR:
Robert McDonah
BY
Nev Pine
ATTORNEY.

UNITED STATES PATENT OFFICE.

ROBERT McDONAH, OF BINGHAMTON, NEW YORK, ASSIGNOR OF ONE-FOURTH TO WARREN N. CROFFUT, OF SAME PLACE.

NUT-LOCK.

SPECIFICATION forming part of Letters Patent No. 421,358, dated February 11, 1890.

Application filed November 7, 1889. Serial No. 329,567. (No model.)

*To all whom it may concern:*

Be it known that I, ROBERT MCDONAH, a citizen of the United States, residing at Binghamton, in the county of Broome and State of New York, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Similar letters refer to similar parts throughout the several views.

My invention is that of a lock-nut for use where jar and strain have a tendency to loosen the nuts, and its object is to provide a simple arrangement which can be used wherever a bolt and nut are needed.

Figure 1:
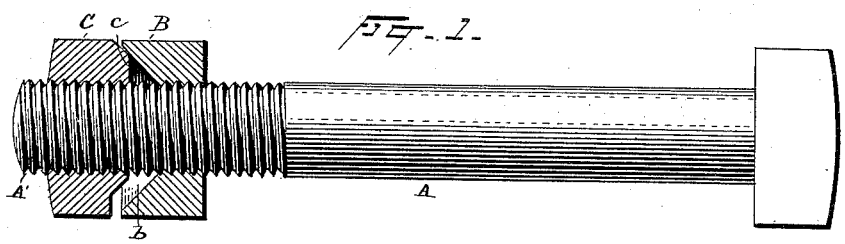
Figure 2:
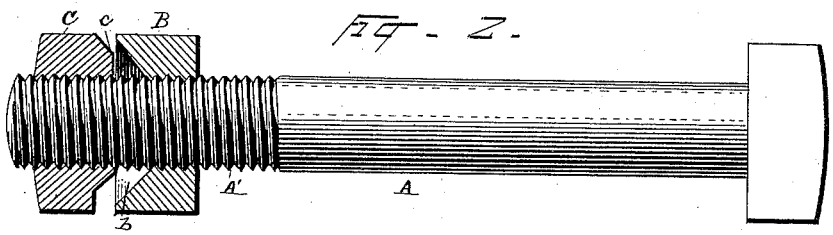
Figure 3:
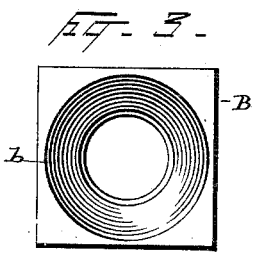
Figure 4:
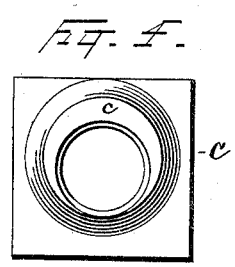

In the accompanying drawings, Figure 1 is a perspective of a bolt with both lock and nut on the screw-threaded bolt, one-half of each of the nuts being cut away to show their form where they come together, and showing them in the position in which they are when the pressure of the lock-nut is first brought to bear upon the nut proper. Fig. 2 is a perspective of the bolt and nuts, as in Fig. 1, except that the nuts are moved apart, so that they do not touch each other. Fig. 3 is a face view of the nut proper, showing its concave surface when prepared for use. Fig. 4 is a view of the face of the lock-nut, showing its convex surface, with the face c, forming an eccentric to bear upon the concave surface of the nut B.

The bolt A is of any common form, and the use of my improved lock-nut does not require any change whatever in the bolt, except that it is to be enough longer to receive another nut. The nut B is made and threaded the same as an ordinary nut, its face being made with the concave surface turned out, as shown in Fig. 3, the concave b being upon a circle having the same center as the hole through the nut. The lock-nut C, cut and threaded to fit the bolt the same as an ordinary nut, has a convex surface turned at the same angle to the side of the nut as is the concave surface on the nut B, so that when both are removed from the bolt the lock-nut C fits perfectly in the nut B. This convex surface, however, is turned from a different center than the center of the hole through the nut, and when one side of the convex is turned down to the hole in the nut upon the other side of the hole is a flat surface c, so that when the lock-nut is on the bolt and turned down upon the main nut B, the convex of the lock-nut bears first against one side of the concave in the main nut, with a cam-bearing, and as the lock-nut is turned down this cam-pressure is brought to bear more firmly upon the lower nut. By this means a steady pressure is brought to bear upon the lower nut B and the lock-nut C, crowding them both sidewise in opposite directions against the thread of the bolt, and when the lock-nut is turned down this side pressure prevents either nut from jarring loose or from being loosened by any strain or jar brought to bear upon them. The lower nut B goes down with its full bearing-surface upon the body to be held, and should be turned down snugly to place, as far as wanted, before the lock-nut is put on. Then the lock-nut should be turned down as far and as close as the strength of the threads will permit.

Having thus described my invention, what I claim as new, and desire to secure by Letters Patent, is—

A locking device for nuts, consisting of a lower nut having on its outer face a concave opening and a following-nut having a convex surface turned from a different center to turn down within the concave opening of the lower nut and bearing against the side of the lower nut, substantially as shown and described.

In witness whereof I have hereto set my hand in the presence of two subscribing witnesses.

ROBERT McDONAH.

Witnesses:
 NETTIE HILTS,
 NERI PINE.